July 11, 1933.    V. G. APPLE    1,917,482
ARMATURE COIL
Original Filed Nov. 18, 1927
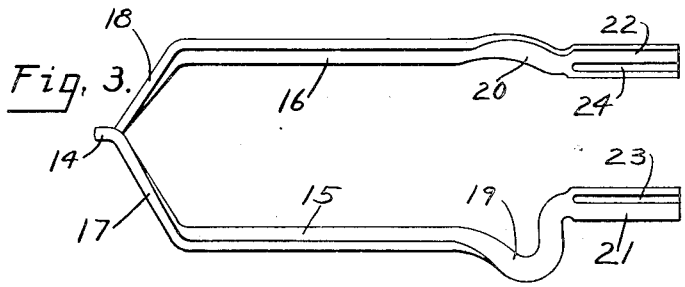
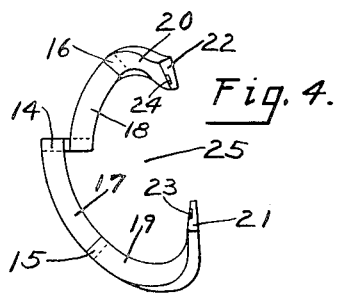
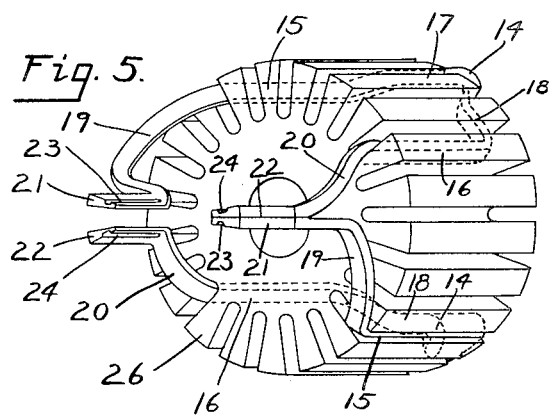
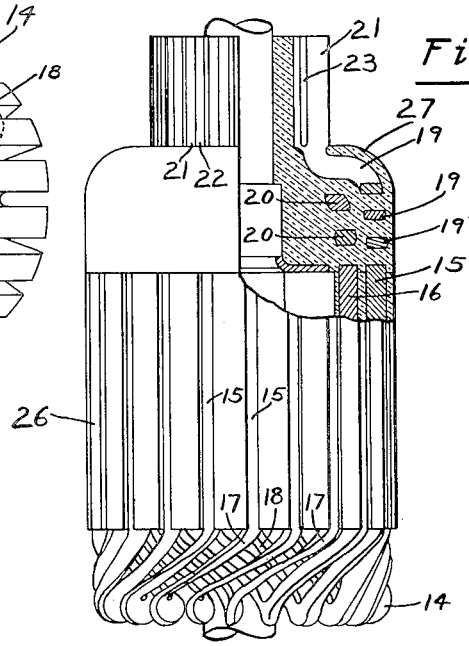
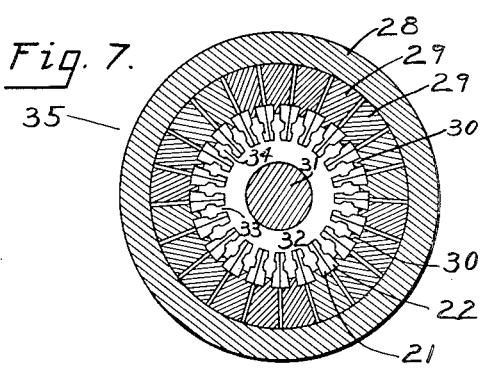
INVENTOR
Vincent G Apple
by Frederick W Cotterman
Attorney Patented July 11, 1933

1,917,482

UNITED STATES PATENT OFFICE

VINCENT G. APPLE, OF DAYTON, OHIO; HERBERT F. APPLE, EDWARD M. APPLE, AND GOURLEY DARROCH EXECUTORS OF SAID VINCENT G. APPLE, DECEASED

ARMATURE COIL

Original application filed November 18, 1927, Serial No. 234,158. Divided and this application filed January 6, 1932. Serial No. 585,019.

This invention relates to bar wound armature coils suitable for radial entry into open core slots, the open ends of the loops being somewhat prolonged and specially formed so that commutator segments may be composed of pairs thereof.

An object of the invention is to reduce the cost of an armature by eliminating the separately made commutator, thereby reducing the number of parts and the amount of labor and material required.

Another object is to improve the electric circuit through an armature by eliminating the soldered, brazed or welded joints commonly made to connect the bars of the winding to the commutator segments.

Further objects will be apparent from a consideration of the following description, reference being had to the drawing wherein—

Fig. 1 is a cross section through wire from which the winding units may be made.

Fig. 2 shows a length of wire Fig. 1 bent back upon itself to hairpin form.

Fig. 3 is a plan view of a complete loop made from wire Fig. 1.

Fig. 4 is an end view of Fig. 3.

Fig. 5 shows two loops placed in a core.

Fig. 6 shows a completed armature, partly in section, wound with wire loops, Figs. 3 and 4.

Fig. 7 is a transverse section through a mold used to bind the loops together.

Similar numerals refer to similar parts throughout the several views.

Heretofore bar wound armatures of the open slot type have usually been made by providing loops of bar stock or wire and radially entering these loops into the open core slots, then providing a separate commutator and joining the open ends of the loops to bars of the commutator by soldering. The volume of current carried by these bar windings is usually large and frequently the solder is melted and the usefulness of the armature destroyed. This, together with the fact that the cost of separately producing a conventional commutator is considerable, and the labor incident to joining the loop ends to the commutator bars is costly, makes the hereinafter described method of great value both as to cost and dependability.

Wire of a cross section 11, Fig. 1, is preferably made by passing a round wire of standard gauge between rollers, but it may be drawn directly to the shape shown. This wire is cut to suitable lengths and each length is bent double to hairpin form as shown in Fig. 2, providing a conductor bar 12, which later becomes a part of the outer layer of the winding, and a conductor bar 13, which later becomes part of the inner layer of the winding, left joined together at 14. The hairpins are next spread to loop form, and Fig. 3 shows such a loop when bent for a wave winding, though it is obvious that a loop for a lap winding is as readily produced from a like hairpin. The loop 25, Figs. 3 and 4, comprises an outer layer conductor bar 15, an inner layer conductor bar 16 joined at 14 by back lead portions 17 and 18, and front lead portions 19 and 20 terminating in commutator lugs 21 and 22.

Lugs 21 and 22 are produced by striking the free ends of the loop in a die and are not necessarily of greater cross sectional area than the wire Fig. 1, though they may be stoved slightly endwise in the die to increase their cross sectional area. The lugs however, are of somewhat greater radial depth than the bars. Grooves 23 and 24 are pressed lengthwise in the sides of lugs 21 and 22 respectively, to help increase the radial depth of the lugs, and to provide ledges whereon the commutator binding means may bear.

While I have herein described one method whereby my winding loops may be made, the claims herein are intended to define the loop as such, whether the special method herein disclosed is followed in producing them or whether they are otherwise fabricated, an obvious method being to cast them, either in permanent or temporary molds.

Fig. 5 shows two loops 25 laid in the slots of a core 26, and the manner in which one pair of lugs 21 and 22 here come together to continue the circuit and form one commutator segment is typical of the entire winding.

When an entire set of loops 25 have been entered into the slots of core 26, the structure is placed in mold 35 where insulation material 27 may be molded between and around front lead portions 19 and 20 and between segments composed of pairs of lugs 21 and 22, into grooves 23 and 24 to bind the structure together.

Fig. 7 shows a cross section taken through mold 35 immediately above the ends of the commutator segment. The mold consists in part, of a ring 28 which is forced over jaws 29, each jaw having a small spacing tang 30 extending between segments composed of pairs of lugs 21 and 22. The radially inward pressure of jaws 29 holds the flat sides of a pair of lugs 21 and 22 in electrical contact and holds the pairs of lugs spaced apart so that insulation may be molded to surround shaft 31 filling space 32, and to extend through openings 33 into pockets 34 to bind the lugs together to form a commutator.

In my copending application, Serial Number 234,158, filed November, 18th, 1927, of which this is a division, I show and claim, in combination, a completed armature having a winding made from the loops herein shown, while in my copending application, Serial Number 315,339, filed October 26th, 1928 now Patent Number 1,843,590, dated February 2nd, 1932, I show and claim the method herein specifically described for making the loop. I therefore do not herein claim the completed armature nor the method of making the loop, but confine my claims to the loop as an article of manufacture.

Having described my invention, I claim—

1. As an integral armature winding unit, a loop closed at one end and open at the other, comprising two parallel spaced apart conductors, connected by the closed end of the loop, and two parallel spaced apart commutator lugs formed of the open ends of the loop, said lugs having longitudinal grooves formed in the sides for the purpose set forth.

2. As an integral armature winding unit, a loop closed at one end and open at the other, comprising two parallel spaced apart conductors connected by the closed end of the loop, and two parallel spaced apart commutator lugs formed of the open ends of the loop, said lugs being somewhat thinner and wider than said bars and having longitudinal grooves in the sides, for the purpose set forth.

3. As an integral armature winding unit, a loop closed at one end and open at the other, comprising two parallel spaced apart conductors connected by the closed end of the loop, and two parallel spaced apart commutator lugs formed of the open ends of the loop, said lugs being of substantially the same cross sectional area as said bars but of different cross sectional shape, and having longitudinal grooves in the sides for the purpose set forth.

4. As an integral armature winding unit, a loop closed at one end and open at the other, comprising two parallel spaced apart conductors of rectangular cross section connected by the closed end of the loop, and two parallel spaced apart wedge shaped commutator lugs formed of the open ends of the loop, said lugs being of substantially the same cross sectional area as said bars and having longitudinal grooves in the sides for the purpose set forth.

5. As an integral armature winding unit, a loop closed at one end and open at the other and formed in a certain relation to an axis, said loop comprising two axially parallel angularly spaced apart conductors, one farther from the said axis than the other and connected by the closed end of the loop, and two axially parallel angularly spaced apart commutator lugs, formed of the open ends of the loop and both at the same distance from the said axis, said lugs having longitudinal grooves in the sides for the purpose disclosed.

6. As an integral armature winding unit, a loop closed at one end and open at the other at the other and formed in a certain relation to an axis, said loop comprising two axially parallel angularly spaced apart conductors, one farther from the said axis than the other and connected by the closed end of the loop, and two axially parallel angularly spaced apart commutator lugs having longitudinal grooves in the sides for a commutator binding means to engage, formed of the open ends of the loop, said lugs being both at the same distance from the said axis but angularly spaced apart to different positions from said bars, integral parts of said bars connecting said bars to said lugs.

7. As an integral armature winding unit, a loop closed at one end and open at the other and formed in a certain relation to an axis, said loop comprising two axially parallel angularly spaced apart conductors, one farther from the said axis than the other and connected by the closed end of the loop, and two axially parallel angularly spaced apart commutator lugs, having longitudinal grooves in the sides for a commutator binding means to engage, formed of the open ends of the loop, said lugs being angularly spaced apart to different positions from said bars, both at the same distance from said axis and both closer to said axis than either of the bars, integral parts of said bars connecting said bars to said lugs.

In testimony whereof I affix my signature.

VINCENT G. APPLE.